(12) United States Patent
Saulters

(10) Patent No.: US 9,412,194 B2
(45) Date of Patent: Aug. 9, 2016

(54) METHOD FOR SUB-PIXEL TEXTURE MAPPING AND FILTERING

(71) Applicant: NVIDIA CORPORATION, Santa Clara, CA (US)

(72) Inventor: Scott Saulters, New Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 360 days.

(21) Appl. No.: 13/730,378

(22) Filed: Dec. 28, 2012

(65) Prior Publication Data

US 2014/0125687 A1 May 8, 2014

(30) Foreign Application Priority Data

Nov. 5, 2012 (TW) .............................. 101141096 A

(51) Int. Cl.
*G09G 5/00* (2006.01)
*G06T 15/04* (2011.01)

(52) U.S. Cl.
CPC ...................................... *G06T 15/04* (2013.01)

(58) Field of Classification Search
None
See application file for complete search history.

(56) References Cited

U.S. PATENT DOCUMENTS

| 6,219,025 | B1 * | 4/2001 | Hill et al. ...................... 345/589 |
| 6,486,887 | B1 * | 11/2002 | Lewis ............................ 345/587 |
| 8,427,500 | B1 * | 4/2013 | Alakuijala ............ G06T 15/503 345/545 |
| 8,704,847 | B2 * | 4/2014 | Higgins et al. ................ 345/591 |
| 2008/0043032 | A1 * | 2/2008 | Mamona et al. ............... 345/582 |

OTHER PUBLICATIONS

OpenGL Programming Guide; Chapter 9: Texture Mapping.

* cited by examiner

*Primary Examiner* — Ryan R Yang
(74) *Attorney, Agent, or Firm* — Artegis Law Group, LLP

(57) ABSTRACT

A method for sub-pixel texture mapping and filtering is provided. The method includes the steps of: dividing an area on a source image into a red (R) sub-area, a green (G) sub-area, and a blue (B) sub-area, where the area on the source image is corresponding to a pixel of a destination image presented by a display device; sampling the R sub-area to obtain a R color value, sampling the G sub-area to obtain a G color value, and sampling the B sub-area to obtain a B color value; and rendering R, G, B color components of the pixel of the destination image according to the R color value, the G color value, and the B color value.

20 Claims, 3 Drawing Sheets

METHOD FOR SUB-PIXEL TEXTURE MAPPING AND FILTERING

CROSS-REFERENCE TO RELATED APPLICATIONS

This application is based on and claims the benefit of priority from Taiwan Patent Application 101141096, filed on Nov. 5, 2012, which is hereby incorporated herein by reference.

BACKGROUND OF THE INVENTION

1. Field of the Invention

The present invention relates to a method for sub-pixel texture mapping and filtering.

2. Description of the Related Art

In a computer graphics system, a graphic processing unit (GPU), when rendering a frame, can read the texture information from a memory to perform texture mapping. Particularly, texture mapping is a very important technique for realism in computer generated 3D (three dimensional) images. Typically, a texture source is a two dimensional array of color values. The individual color values are called texels. Each texel has a unique address in the texture source.

For further details about the conventional arts, please refer to such as OpenGL Programming Guide, Chapter 9: Texture Mapping.

SUMMARY OF THE INVENTION

One aspect of the present invention is to provide a method for sub-pixel texture mapping and filtering. Conventionally, different color components would be sampled in the same area on the texture source image. In contrast, one feature of the present invention is to divide an area into several juxtaposed sub-areas, and only one color component will be sampled in each sub-area.

Another aspect of the present invention is to provide sharper imaging on high frequency textures, sharper imaging on surfaces viewed from acute angles, highly effective on specular and normal mapping techniques, and hardware implementation should require no additional bandwidth.

An embodiment of the present invention will be particularly advantageous in a LCD display device, where the color of each pixel perceived by the user is actually formed and mixed by a set of sub-pixels, which are spatially juxtaposed and separately controllable on the LCD display device. By performing the sampling and filtering in sub-areas juxtaposed on the texture source image, it is feasible to control each sub-pixel on the display device in a more accurate manner and accordingly provide a sharper image.

An embodiment of the present invention provides a method for sub-pixel texture mapping and filtering. The method includes the steps of:
- dividing an area on a source image into a red (R) sub-area, a green (G) sub-area, and a blue (B) sub-area, where the area on the source image is corresponding to a pixel of a destination image presented by a display device;
- sampling the R sub-area to obtain a R color value, sampling the G sub-area to obtain a G color value, and sampling the B sub-area to obtain a B color value; and
- rendering R, G, B color components of the pixel of the destination image according to the R color value, the G color value, and the B color value.

Another embodiment of the present invention provides a method performed by a graphic driver for sub-pixel texture mapping and filtering a source image into a destination image to be presented by a display device, the method comprising: loading a shader onto a graphic processing unit (GPU), in order to enable the GPU to perform the following steps:
- dividing an area on the source image into a predetermined number of sub-areas, where the area on the source image is corresponding to a pixel of the destination image presented by the display device;
- sampling a first sub-area to obtain a first color value for a first color component; and
- rendering the first color component of the pixel of the destination image according to the first color value of the first sub-area.

Another embodiment of the present invention provides a computer system, which includes:
- a graphic processing unit (GPU); and
- a central processing unit, which is electrically connected with said GPU for executing a graphics driver of said GPU to perform the methods mentioned above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
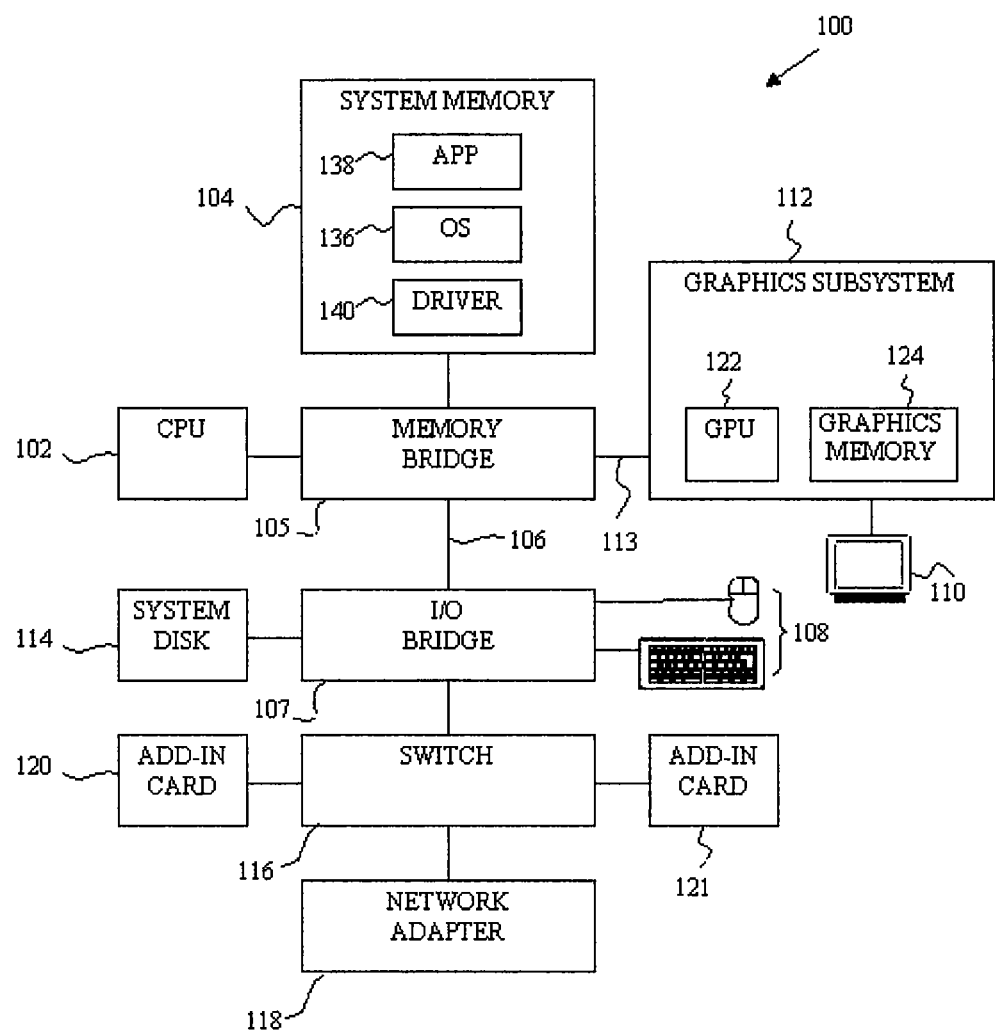
FIG. 1 is a block diagram of a computer system according to an embodiment of the present invention.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 3B, computer system, methods, and computer program products are illustrated as structural or functional block diagrams or process flowcharts according to various embodiments of the present invention. The flowchart and block diagrams in the Figures illustrate the architecture, functionality, and operation of possible implementations of computer system, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that embodiments can be practiced on many different types of computer system 100. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

FIG. 1 is a block diagram of a computer system 100 according to an embodiment of the present invention. Computer system 100 includes a central processing unit (CPU) 102. CPU 102 communicates with a system memory 104 via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be a GPU 122 with one core or multiple cores. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 may also include a scanout module configured to deliver pixel data from graphics memory 124 to display device 110. It will be appreciated that the particular configuration and functionality of graphics processing subsystem 112 is not critical to the present invention, and a detailed description has been omitted.

CPU 102 operates as the master processor of system 100, controlling and coordinating operations of other system components. During operation of system 100, CPU 102 executes various programs that are resident in system memory 104. In one embodiment, these programs include one or more operating system (OS) programs 136, one or more graphics applications 138, and one or more graphics drivers 140 for controlling operation of GPU 122. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 114, and/or in other storage space.

Operating system programs 136 and/or graphics applications 138 may be of conventional design. A graphics application 138 may be, for instance, a video game program that generates graphics data and invokes appropriate functions of GPU 122 to transform the graphics data to pixel data. Another application 138 may generate pixel data and provide the pixel data to graphics memory 124 for display by GPU 122. It is to be understood that any number of applications that generate pixel and/or graphics data may be executing concurrently on CPU 102. Operating system programs 136 (e.g., the Graphical Device Interface (GDI) component of the Microsoft Windows operating system) may also generate pixel and/or graphics data to be processed by GPU 122. In some embodiments, applications 138 and/or operating system programs 136 may also invoke functions of GPU 122 for general-purpose computation.

Graphics driver 140 enables communication with graphics subsystem 112, e.g., with GPU 122. Graphics driver 140 advantageously implements one or more standard kernel-mode driver interfaces such as Microsoft D3D. OS programs 136 advantageously include a run-time component that provides a kernel-mode graphics driver interface via which graphics application 138 communicates with a kernel-mode graphics driver 140. Thus, by invoking appropriate function calls, operating system programs 136 and/or graphics applications 138 can instruct graphics driver 140 to transfer geometry data or pixel data to graphics processing subsystem 112, to control rendering and/or scanout operations of GPU 122, and so on. The specific commands and/or data transmitted to graphics processing subsystem 112 by driver 140 in response to a function call may vary depending on the implementation of graphics subsystem 112, and driver 140 may also transmit commands and/or data implementing additional functionality (e.g., special visual effects) not controlled by operating system programs 136 or applications 138.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of graphics subsystem 112 to the rest of system 100 may also be varied. In some embodiments, graphics system 112 is implemented as an add-in card that can be inserted into an expansion slot of system 100. In other embodiments, graphics subsystem 112 includes a GPU that is integrated on a single chip with a bus bridge, such as memory bridge 105 or I/O bridge 107. Graphics subsystem 112 may include any amount of dedicated graphics memory, including no dedicated memory, and may use dedicated graphics memory and system memory in any combination. Further, any number of GPUs may be included in graphics subsystem 112, e.g., by including multiple GPUs on a single graphics card or by connecting multiple graphics cards to bus 113.

Flow Process

Figure 2:
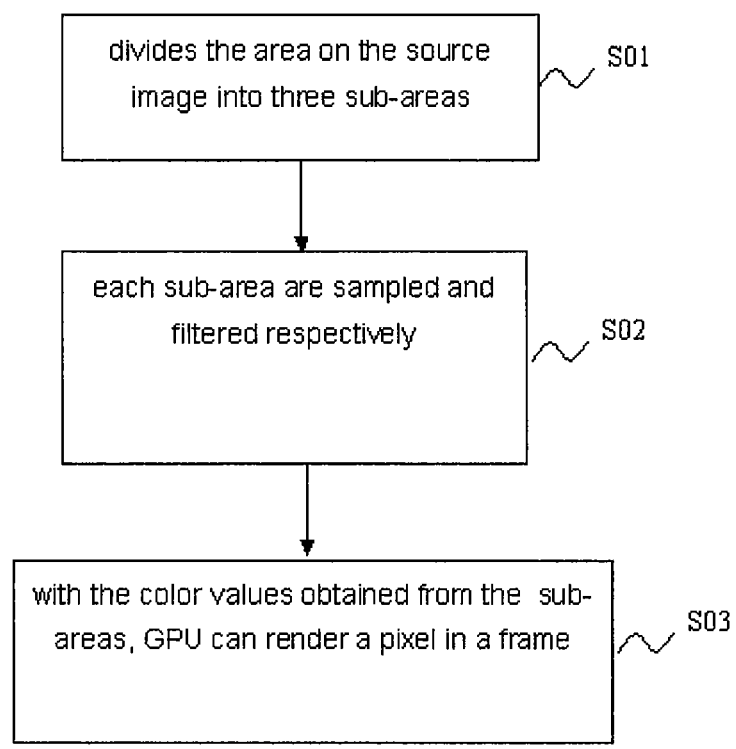
FIG. 2 is a flow diagram of a method for sub-pixel texture mapping and filtering.

FIG. 2 is a flow diagram of a method for sub-pixel texture mapping and filtering. The method may be applied to the computer system 100 as shown in FIG. 1. In particular, the method may be executed by the central processing unit 102 running a GPU driver 140 in cooperation with the graphic processing unit 122 running a shader loaded by the GPU driver 140. Further, the functionality of the method can be turned on/off programmatically, for example, using a command to enable/disable the shader, or via an extension to the graphics API to enable/disable the shader.

Figure 3A:
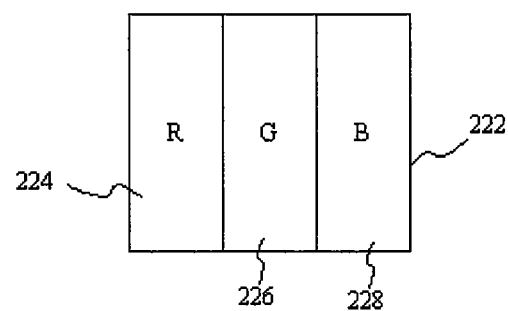
FIG. 3A are sub-pixels of a pixel according to an embodiment of the present invention.

On the other hand, as shown in FIG. 3A, a display device (such as the display device 110 shown in FIG. 1) has many pixels 222 (but FIG. 3A shows only one pixel 222). Each pixel 222 is responsible for showing a pixel in a frame rendered by GPU 122. In one embodiment, a pixel 222 is composed of sub-pixels (such as the red (R) sub-pixel 224, the green (G) sub-pixel 226, and the blue (B) sub-pixel 228) corresponding to a given number of color components. All the pixels 222 on the display device together can present a full-color picture to the user.

Figure 3B:
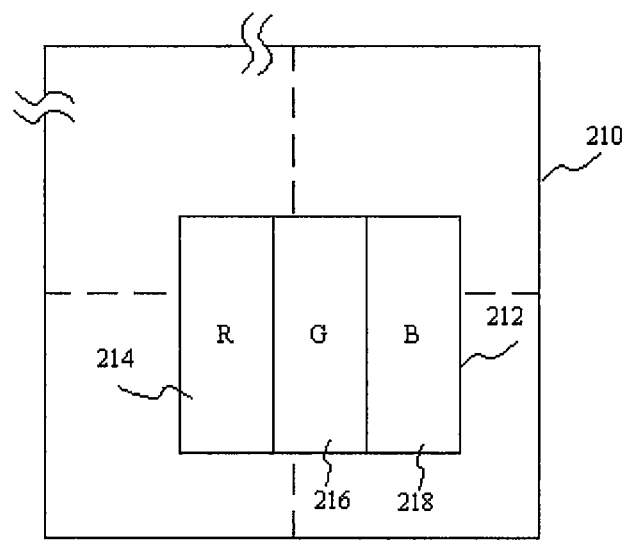
FIG. 3B is a texture source image according to an embodiment of the present invention.

Meanwhile FIG. 3B shows the texture source image 210, supplied by the graphic application 138. An area 212 on the source image 210 is corresponding to a pixel in a frame rendered by GPU 122, and the pixel in the rendered frame will be shown by a pixel 222 (shown in FIG. 3A) on the display device.

More details will be provided in the following in connection with FIG. 1, FIG. 2, and FIGS. 3A and 3B.

Step S01: GPU 122, by running the shader loaded from the GPU driver 140, divides the area 212 on the source image 210 into three sub-areas, i.e., the red (R) sub-area 214, the green (G) sub-area 216, and the blue (B) sub-area 218, as shown in FIG. 3B, according to the number of sub-pixels corresponding to color components (i.e., R, G, B) in a pixel 222.

In addition to the number of the sub-areas, preferably, the division of the area 212 on the source image 210 relates to the arrangement of the color sub-pixels in a pixel 222. As shown in FIG. 3A, a pixel 222 is composed of the red (R) sub-pixel 224, the green (G) sub-pixel 226, and the blue (B) sub-pixel 228, which are arranged with a given orientation (e.g., a horizontal direction) and a given sequence (e.g., R, G, B, from left to right). Accordingly, as shown in FIG. 3B, the red (R) sub-area 214, the green (G) sub-area 216, and the blue (B) sub-area 218 has the same orientation and the same sequence with the red (R) sub-pixel 224, the green (G) sub-pixel 226, and the blue (B) sub-pixel 228 in FIG. 3A. However, in other embodiment, the sub-areas on the source image 210 can have different arrangements from the sub-pixels in a pixel 222.

In order to make the sub-areas on the source image 210 match the sub-pixels in a pixel 222, the GPU driver 140 can detect the orientation and the sequence of the sub-pixels making up a pixel 222 before loading an appropriate shader, which contains the actual texture sampling function/commands, to GPU 122. For such purpose, GPU driver 140 may need to communicate with operation system of the computer system 100 or rely on other programs for the detection.

Step S02: After the division of the area 212 on the source image 210, each sub-area are sampled and filtered respectively in this step. Particularly, a sub-area is sampled only for one color component, while the other color components are filtered out. Preferably, the sampled color component in a sub-area is related to the color of sub-pixel to which the sub-area is corresponding, as illustrated in FIGS. 3A and 3B.

For example, for the R sub-area 214 (corresponding to R sub-pixel 224), only the red color component is sampled to obtain a red (R) color value, without sampling the green color component and the blue color component. Similarly, for the G sub-area 216 (corresponding to G sub-pixel 226), only the green color component is sampled to get a green (G) color value, without sampling the red color component and the blue color component; for the B sub-area 218 (corresponding to B sub-pixel 228), only the blue color component is sampled to get a blue (B) color value, without sampling the red color component and the green color component.

On the other hand, note that the present invention does not intend to limit the algorithm implemented by the shader for color sampling in sub-areas, and any known algorithms such as Bilinear Filter could be applied if they are appropriate for the purpose of the present invention.

Step S03: With the R color value obtained from the R sub-area 214, the G color value obtained from the G sub-area 216, and B color value obtained from the B sub-area 218, GPU 122 can render a pixel in a frame (that is, the pixel corresponding to the area 212 on the source image 210), and the pixel in the rendered frame will be shown by a pixel 222 on the display device, as shown in FIG. 3A. Because the pixel 222 is composed of the R sub-pixel 224, the G sub-pixel 224, and the B sub-pixel 228, the R sub-pixel 224 could be controlled with the R color value obtained from the R sub-area 214; similarly, the G sub-pixel 226 could be controlled with the G color value from the G sub-area 216, and the B sub-pixel 228 could be controlled with the B color value from the B sub-area 218.

Conventionally, all color components would be sampled in the same area on the texture source image. In contrast, in the embodiment mentioned above, specific color components are sampled in different sub-areas, and sampled color values obtained in respective sub-areas (rather than in the same area in the conventional arts) could be used to control each sub-pixel in a more accurate way and achieve a better visual quality of image. Moreover, an embodiment of the present invention allows GPU to use the same amount of color value data (i.e., a set of RGB values) as the conventional arts to render a pixel, without requiring addition bandwidth for data communication.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The invention claimed is:

1. A method for sub-pixel texture mapping and filtering a source image into a destination image to be presented by a display device, the method comprising:
   dividing an area on the source image into a red sub-area, a green sub-area, and a blue sub-area;
   sampling the red sub-area to obtain a red color value corresponding to a red color component;
   sampling the green sub-area to obtain a green color value corresponding to a green color component;
   sampling the blue sub-area to obtain a blue color value corresponding to a blue color component; and
   rendering red, green and blue color components of a pixel of the destination image according to the red color value, the green color value, and the blue color value.

2. The method of claim 1, further comprising detecting the orientation of the red sub-area, the green sub-area, and the blue sub-area.

3. The method of claim 1, wherein the red sub-area, the green sub-area, and the blue sub-area are arranged according to an arrangement of sub-pixels corresponding to red, green, and blue color components of the display device.

4. The method of claim 1, wherein the red sub-area, the green sub-area, and the blue sub-area on the source image are arranged horizontally, and the red, green, and blue color components of the pixel of the destination image are arranged horizontally.

5. The method of claim 1, wherein the red sub-area, the green sub-area, and the blue sub-area on the source image are arranged horizontally, and the red, green, and blue color components of the pixel of the destination image are arranged vertically.

6. The method of claim 1, wherein:
   the red sub-area is sampled only once;
   the green sub-area is sampled only once; and
   the blue sub-area is sampled only once.

7. The method of claim 1, wherein:
   sampling the red sub-area further comprises filtering out non-red colors;
   sampling the green sub-area further comprises filtering out non-green colors; and
   sampling the blue sub-area further comprises filtering out non-blue colors.

8. The method of claim 1, wherein rendering red, green and blue color components of the pixel further comprises:
   controlling the red color component of the pixel using the sampled red color value;
   controlling the green color component of the pixel using the sampled green color value; and
   controlling the blue color component of the pixel using the sampled blue color value.

9. The method of claim 1, wherein the source image comprises a texture.

10. A non-transitory computer-readable medium storing instructions, that when executed by a processor, cause a computer system to map a source image into a destination image to be presented by a display device, by performing the steps of:
    dividing an area on the source image into a red sub-area, a green sub-area, and a blue sub-area;
    sampling the red sub-area to obtain a red color value corresponding to a red color component;
    sampling the green sub-area to obtain a green color value corresponding to a green color component;
    sampling the blue sub-area to obtain a blue color value corresponding to a blue color component; and
    rendering red, green and blue color components of the pixel of the destination image according to the red color value, the green color value, and the blue color value.

11. The non-transitory computer-readable medium of claim 10, further comprising detecting the orientation of the red sub-area, the green sub-area, and the blue sub-area.

12. The non-transitory computer-readable medium of claim 10, wherein the red sub-area, the green sub-area, and the blue sub-area are arranged according to an arrangement of sub-pixels corresponding to the red, green, and blue color components of the display device.

13. The non-transitory computer-readable medium of claim 10, wherein the red sub-area, the green sub-area, and the blue sub-area on the source image are arranged horizontally, and the red, green, and blue color components of the pixel of the destination image are arranged horizontally.

14. The non-transitory computer-readable medium of claim 10, wherein the red sub-area, the green sub-area, and the blue sub-area on the source image are arranged horizontally, and the red, green, and blue color components of the pixel of the destination image are arranged vertically.

15. The non-transitory computer-readable medium of claim 10, wherein:
    the red sub-area is sampled only once;
    the green sub-area is sampled only once; and
    the blue sub-area is sampled only once.

16. The non-transitory computer-readable medium of claim 10, wherein:
    sampling the red sub-area further comprises filtering out non-red colors;
    sampling the green sub-area further comprises filtering out non-green colors; and
    sampling the blue sub-area further comprises filtering out non-blue colors.

17. The non-transitory computer-readable medium of claim 10, wherein rendering red, green and blue color components of the pixel further comprises:
- controlling the red color component of the pixel using the sampled red color value;
- controlling the green color component of the pixel using the sampled green color value; and
- controlling the blue color component of the pixel using the sampled blue color value.

18. The non-transitory computer-readable medium of claim 10, wherein the source image comprises a texture.

19. A computing device for causing a computer system to map a source image into a destination image to be presented by a display device, the computing device comprising:
- a processor; and
- a memory coupled to the processor, wherein the memory includes a program having instructions that, when executed by the processor, cause the processor to:
    - sample a red sub-area of the source image to obtain a red color value;
    - sample a green sub-area of the source image to obtain a green color value;
    - sample a blue sub-area of the source image to obtain a blue color value; and
    - render red, green and blue color components of a pixel of the destination image according to the red color value, the green color value, and the blue color value.

20. The computing device of claim 19, further comprising detecting the orientation of the red sub-area, the green sub-area, and the blue sub-area.

* * * * *